US011312319B2

(12) United States Patent
Eshima et al.

(10) Patent No.: US 11,312,319 B2
(45) Date of Patent: Apr. 26, 2022

(54) WIRE HARNESS

(71) Applicant: Hitachi Metals, Ltd., Tokyo (JP)

(72) Inventors: Hirotaka Eshima, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 35 days.

(21) Appl. No.: 16/777,617

(22) Filed: Jan. 30, 2020

(65) Prior Publication Data
US 2020/0262364 A1 Aug. 20, 2020

(30) Foreign Application Priority Data
Feb. 15, 2019 (JP) .............................. JP2019-025191

(51) Int. Cl.
| B60R 16/02 | (2006.01) |
| H01B 7/00 | (2006.01) |
| H01B 7/18 | (2006.01) |
| H02G 3/04 | (2006.01) |

(52) U.S. Cl.
CPC ....... B60R 16/0215 (2013.01); H01B 7/0045 (2013.01); H01B 7/18 (2013.01); H02G 3/0406 (2013.01); H02G 3/0462 (2013.01)

(58) Field of Classification Search
CPC . B60R 16/023; B60R 16/0215; H01B 7/0045; H01B 7/18; H02G 3/0406; H02G 3/0462
See application file for complete search history.

(56) References Cited

U.S. PATENT DOCUMENTS

| 4,374,596 A | * | 2/1983 | Schlemmer | .............. H02G 3/06 138/155 |
| 4,992,626 A | * | 2/1991 | Monroe | ............... H01B 7/0045 156/51 |
| 10,399,515 B2 | | 9/2019 | Shimizu et al. | |
| 2011/0182459 A1 | * | 7/2011 | Aase | ....................... B29C 43/18 381/384 |

(Continued)

FOREIGN PATENT DOCUMENTS

| JP | 2016-091731 A | 5/2016 |
| JP | 6213447 B2 | 10/2017 |

*Primary Examiner* — Steven T Sawyer
*Assistant Examiner* — Paresh H Paghadal
(74) *Attorney, Agent, or Firm* — McGinn IP Law Group, PLLC (57) ABSTRACT

A wire harness includes a plurality of insulated electric wires, a sheath covering a part in a longitudinal direction of the insulated wires, and a branching portion fixing member covering an end portion of the sheath with the insulated wires guided out therefrom, and one-parts in respective longitudinal directions of the insulated wires being guided out from the end portion of the sheath. The branching portion fixing member includes a plurality of guiding-out portions to guide out the one-parts of the plurality of insulated wires respectively. The wire harness is provided with a protective tube to cover at least one of the guiding-out portions, and the insulated wire guided out from the at least one of the guiding-out portions, and a tightening member to tighten and fix one end portion of the protective tube to an outer peripheral surface of the at least one of the guiding-out portions.

20 Claims, 5 Drawing Sheets

(56) References Cited

U.S. PATENT DOCUMENTS

| | | | |
|---|---|---|---|
| 2014/0251681 A1* | 9/2014 | Adachi | H02G 3/0481 |
| | | | 174/72 A |
| 2015/0101842 A1* | 4/2015 | Han | B60R 16/0215 |
| | | | 174/50.57 |
| 2016/0339854 A1* | 11/2016 | Hayakawa | H01B 3/30 |
| 2017/0313265 A1* | 11/2017 | Shimizu | B60R 16/023 |
| 2017/0324231 A1* | 11/2017 | Mizutani | H02G 3/06 |
| 2019/0071036 A1 | 3/2019 | Shimizu et al. | |
| 2019/0351847 A1 | 11/2019 | Shimizu et al. | |
| 2020/0111588 A1* | 4/2020 | Yamamoto | B60R 16/0207 |

* cited by examiner

WIRE HARNESS

CROSS-REFERENCE TO RELATED APPLICATIONS

The present invention is based on Japanese Patent Application No. 2019-25191 filed on Feb. 15, 2019, the entire contents of which are incorporated herein by reference.

BACKGROUND OF THE INVENTION

1. Field of the Invention

The present invention relates to a wire harness.

2. Description of the Related Art

Conventionally, for example, there has been known a wire harness, which is configured to include one pair of sensor electric wires, which are designed to carry out an automobile ABS (anti-lock brake system) sensor detection signal transmission, and one pair of parking brake electric wires, which are designed to operate an electric parking brake, with the one pair of sensor electric wires and the one pair of parking brake electric wires being made integral with each other by being covering with a common sheath. For example, Japanese Patent No. 6213447 below proposes a wire harness, which is provided with a resin mold over a branching portion in which the sensor electric wires and the parking brake electric wires are branching off from an end portion of a sheath.

[Patent Document 1] Japanese Patent No. 6213447

SUMMARY OF THE INVENTION

In the electric wire harness disclosed in Japanese Patent No. 6213447, in the event of chipped off stone or the like hitting on the sensor electric wires and the parking brake electric wires being extended out from the resin mold, damage to the electric wires may occur.

In view of the foregoing, an object of the present invention is to provide a wire harness that is designed to be able to suppress the occurrence of damage to an electric wire due to a chipped off stone or the like.

For the purpose of solving the above problems, the present invention provides a wire harness, comprising:

a plurality of insulated electric wires, each including a conductor wire, and an electrical insulating member covering the conductor wire;

a sheath covering a part in a longitudinal direction of the plurality of insulated electric wires; and a branching portion fixing member covering an end portion of the sheath with the plurality of insulated electric wires being guided out therefrom, and one-parts in respective longitudinal directions of the plurality of insulated electric wires being guided out from the end portion of the sheath, the branching portion fixing member including a plurality of cylindrical shape guiding out portions, which are configured to guide out the one parts of the plurality of insulated electric wires respectively, wherein the wire harness further comprises:

an elastic protective tube, which is provided to cover at least one of the plurality of guiding out portions constituting the branching portion fixing member, and the insulated electric wire being guided out from the at least one of the plurality of guiding out portions, and a tightening member, which is provided to tighten and fix one end portion of the protective tube to an outer peripheral surface of the at least one of the plurality of guiding out portions.

Points of the Invention

According to the present invention, it is possible to provide the wire harness which is capable of suppressing the occurrence of damage to the electric wires due to a chipped off stone or the like.

DETAILED DESCRIPTION OF THE PREFERRED EMBODIMENTS

Embodiments

Hereinafter, embodiments of the present invention will be described with reference to the accompanying drawings.

Figure 1:
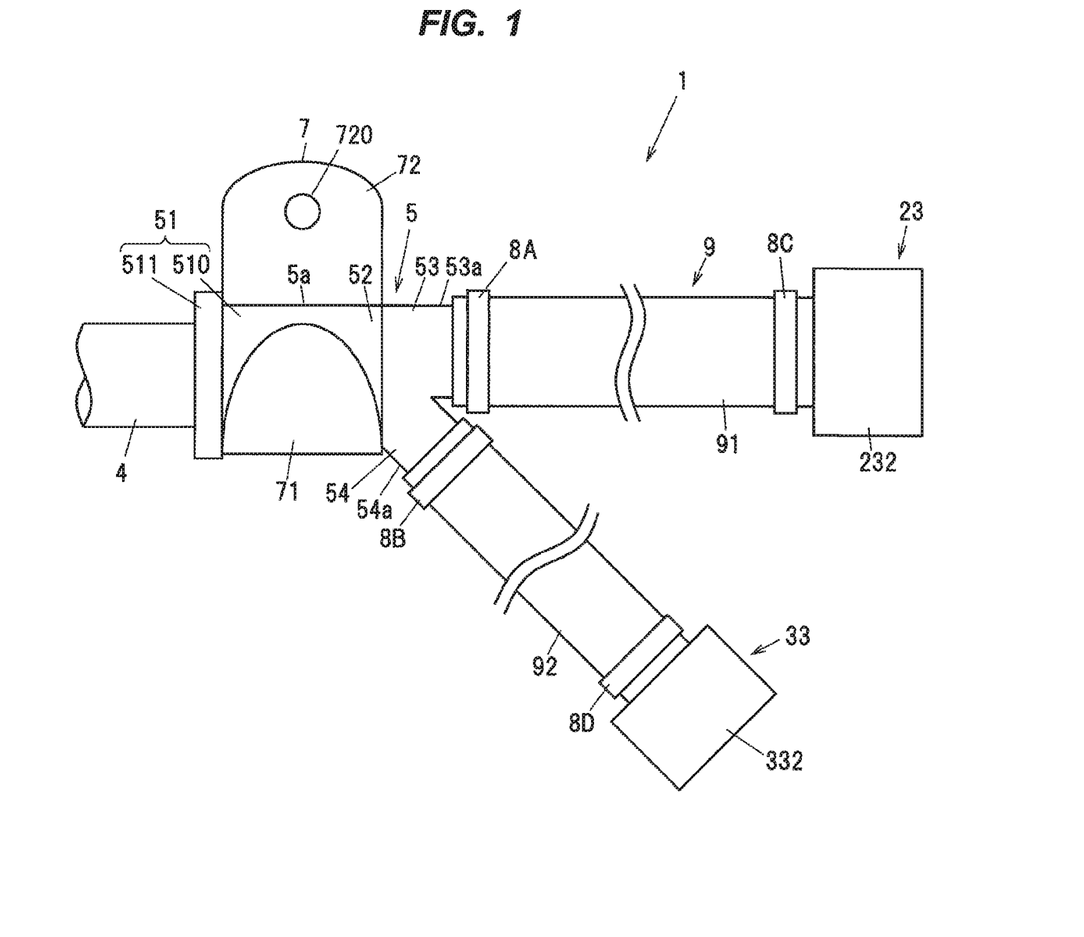
FIG. 1 is a front view showing a wire harness according to one embodiment of the present invention.
Figure 2:
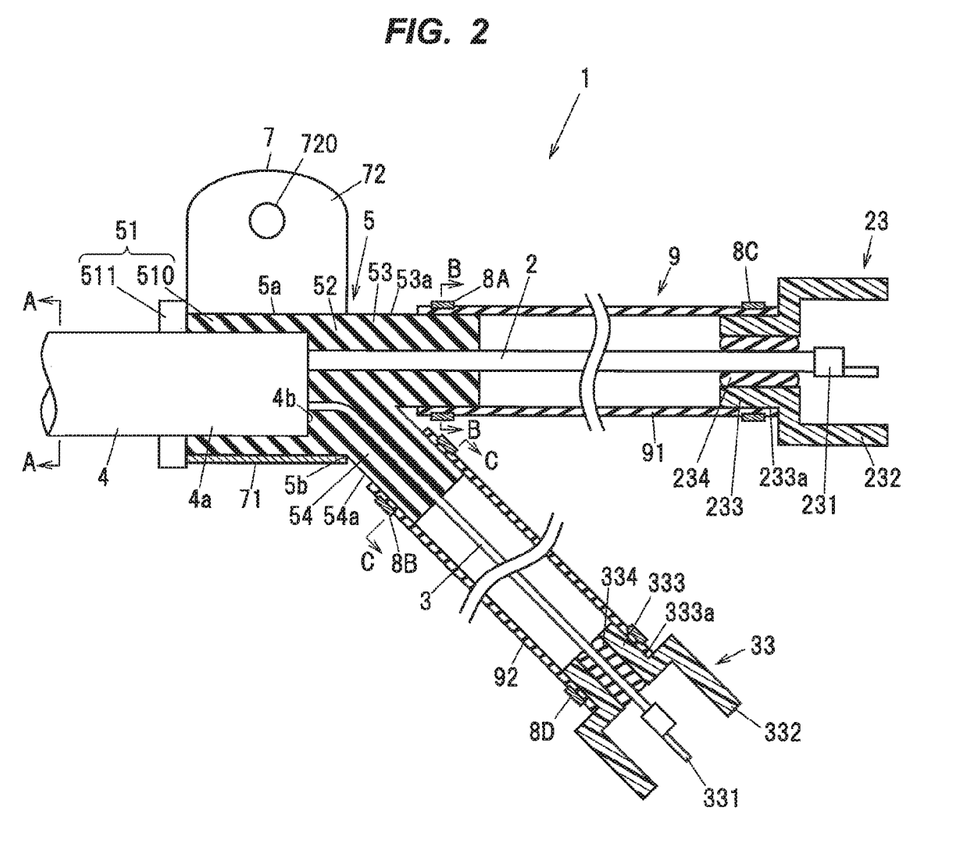
FIG. 2 is a longitudinal cross-sectional view showing the wire harness shown in FIG. 1.
Figure 3A:
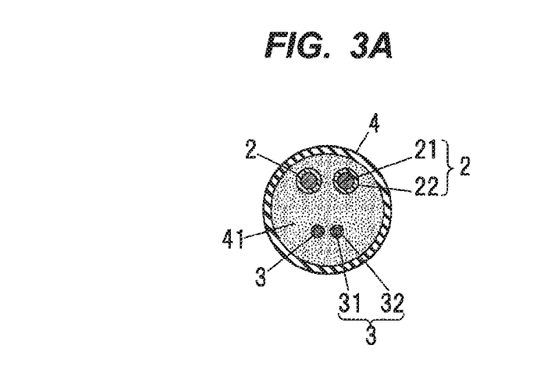
FIG. 3A is a cross-sectional view taken along line A-A in FIG. 2.
Figure 3B:
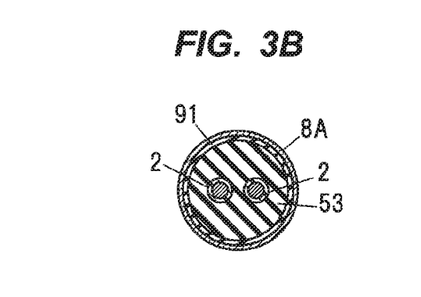
FIG. 3B is a cross-sectional view taken along line B-B in FIG. 2.
Figure 3C:
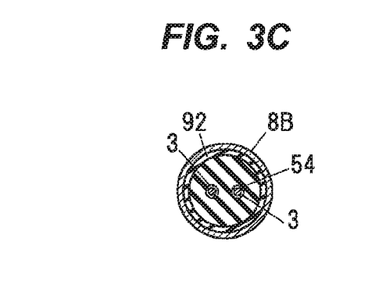
FIG. 3C is a cross-sectional view taken along line C-C in FIG. 2.

FIG. 1 is a front view showing a wire harness according to the present embodiment. FIG. 2 is a longitudinal cross-sectional view showing the wire harness shown in FIG. 1. FIG. 3A is a cross-sectional view taken along line A-A of FIG. 2, FIG. 3B is a cross-sectional view taken along line B-B of FIG. 2, and FIG. 3C is a cross-sectional view taken along line C-C of FIG. 2.

As shown in FIGS. 1 to 3C, the wire harness 1 is configured to include one pair of first insulated electric wires 2 and one pair of second insulated electric wires 3, a sheath 4, which is covering a part in a longitudinal direction of the first two and the second two insulated electric wires 2 and 3, a molded member 5, which is configured as a branching portion fixing member and covering an end portion 4a of the sheath 4, and one-parts in respective longitudinal directions of the first two and the second two insulated electric wires 2 and 3 being guided out from the end portion 4a of the sheath 4, and a bracket 7, which is configured as a fixing member.

The wire harness 1 is mounted on a vehicle, and the bracket 7 is fixed to a vehicle body side by a fastener member not shown such as a bolt or a rivet or the like being inserted in and passed through a through hole 720 in the bracket 7. The one pair of first insulated electric wires 2 are a parking brake electric wire designed to supply operating electric power to an electric parking brake, for example. The one pair of second insulated electric wires 3 are a sensor electric wire designed to carry out an ABS (anti-lock brake system) sensor detection signal transmission, for example. Alternatively, the one pair of first insulated electric wires 2 or the one pair of second insulated electric wires 3 may be a damper electric wire designed to control an electronically controlled damper. Alternatively, a damper electric wire may be added as a third insulated electric wire and accommodated in the sheath 4.

The one pair of first insulated electric wires 2 are each composed of a conductor wire 21 composed of a plurality of wires made of a copper or a copper alloy being stranded together, for example, and an electrical insulating member 22 covering the respective conductor wire 21. Similarly, the one pair of second insulated electric wires 3 are each composed of a conductor wire 31 composed of a plurality of wires made of a copper or a copper alloy being stranded together, for example, and an electrical insulating member 32 covering the respective conductor wire 31. Note that the one pair of first insulated electric wires 2 are formed thicker than the one pair of first insulated electric wires 3.

The sheath 4 is of a cylindrical shape, and is configured to cover the one pair of first insulated electric wires 2 and the one pair of second insulated electric wires 3 together. Within the sheath 4, a fibrous filling member 41 is arranged between an inner surface of the sheath 4 and the first two and the second two insulated electric wires 2 and 3. One end portion of the sheath 4 is held in the molded member 5, while the other end portion of the sheath 4 is held in a case for a control device not shown.

The molded member 5 is configured to integrally include a sheath holding portion 51, which is covering an outer periphery of the end portion 4a of the sheath 4 with the first two and the second two insulated electric wires 2 and 3 being guided out therefrom, to hold a part in the longitudinal direction of the sheath 4, an electric wire holding portion 52, which is configured to hold a part in the longitudinal direction of the first two and the second two insulated electric wires 2 and 3 being guided out from the sheath 4, a first guiding out portion 53, which is configured to guide out the two first insulated electric wires 2 (which are some ones of the plurality (four) of insulated electric wires) from the electric wire holding portion 52 in a first direction (for example, an axial direction), and a second guiding out portion 54, which is configured to guide out the two second insulated electric wires 3 (which are some other ones of the plurality (four) of insulated electric wires) from the electric wire holding portion 52 in a different direction (for example, an oblique direction) from the first direction.

The sheath 4 is held linearly in the sheath holding portion 51 of the molded member 5. The one pair of first insulated electric wires 2 are held linearly in the electric wire holding portion 52 of the molded member 5 and parallel to the sheath 4 held in the sheath holding portion 51. The one pair of second insulated electric wires 3 are bent within the electric wire holding portion 52 of the molded member 5 and guided out from the molded member 5 in a direction different from the direction of guiding out the one pair of first insulated electric wires 2. Hereinafter, the direction of the central axis of the sheath 4 held in the sheath holding portion 51 will be referred to as the axial direction, and the oblique direction relative to this axial direction will be referred to as the oblique direction, while the perpendicular directions relative to that axial direction will be referred to as the radial directions.

When viewed from the radial directions, the sheath holding portion 51 is formed as a part of the molded member 5 over the outer peripheral side of the sheath 4, while the electric wire holding portion 52 is formed as a tip part of the molded member 5, which is extending from an open end face 4b of the sheath 4, and further the first and the second guiding out portions 53 and 54 are formed as tip parts of the molded member 5, which are each extending from the electric wire holding portion 52. The sheath holding portion 51 is configured to include a circular cylindrical shape main body section 510, and a ring shape flange section 511, which is provided to protrude in the radial directions from that main body section 510. The constituent flange section 511 of the sheath holding portion 51 is provided to protrude outward in the radial directions from an outer peripheral surface 5a of the molded member 5 around which a constituent wrapping and tightening portion 71 of the bracket 7 is wrapped and tightened.

The molded member 5 is made of a rubber-like elastic body such as an EPDM (ethylene propylene diene rubber) or the like. Since the EPDM is a relatively soft material and so is able to be bent while following the bending of the first two and the second two insulated electric wires 2 and 3, the EPDM is able to suppress the occurrence of a damage to the first two and the second two insulated electric wires 2 and 3. Note that the material for the molded member 5 is not limited to the EPDM, but that an urethane rubber, a silicon rubber, a butyl rubber, a fluorine rubber, an acrylic rubber, or a butadiene rubber may be used as the material for the molded member 5. Since the molded member 5 is configured with the rubber elastic body, though it is possible to allow the first two and the second two insulated electric wires 2 and 3 to remain fixed in their guiding out directions respectively, even when the first two and the second two insulated electric wires 2 and 3 are bent by a vehicle vibration or the like, the molded member 5 is also bent while following the bending of the first two and the second two insulated electric wires 2 and 3, therefore making it possible to suppress the occurrence of a damage to the first two and the second two insulated electric wires 2 and 3.

The first guiding out portion 53 constituting the molded member 5 is formed in a circular cylindrical shape smaller in diameter than the electric wire holding portion 52, while the second guiding out portion 54 is formed in a circular cylindrical shape smaller in diameter than the first guiding out portion 53. The first guiding out portion 53 is formed with a plurality (two in the present embodiment) of first insertion passages spaced apart from each other therein for the first insulated electric wires 2 respectively to be inserted in and passed through. The second guiding out portion 54 constituting the molded member 5 is formed with a plurality (two in the present embodiment) of second insertion passages spaced apart from each other therein for the second insulated electric wires 3 respectively to be inserted in and passed through. By protruding the second guiding out portion 54 in the oblique direction from the electric wire holding portion 52, a boundary 5b is formed between the outer peripheral surface 5a of the electric wire holding portion 52 and an outer peripheral surface 54a of the second guiding out portion 54. When the constituent wrapping and tightening portion 71 of the bracket 7 is wrapped and tightened around the outer peripheral surface 5a of the molded member 5, the wrapping and tightening portion 71 constituting the bracket 7 is held between the constituent flange section 511 of the sheath holding portion 51 and the boundary 5b lying between the outer peripheral surface 5a of the electric wire holding portion 52 and the outer peripheral surface 54a of the second guiding out portion 54 constituting the molded member 5, so that the movement of the bracket 7 in the axial direction relative to the molded member 5 is regulated. In this manner, the movement of the bracket 7 configured as the fixing member to one side relative to the molded member 5 is regulated by the second guiding out portion 54. Note that the "movement to one side" refers to the movement in a direction away from the sheath 4 (in FIG. 2, in the right direction). Further, the movement of the bracket 7 configured as the fixing member to the other side (in FIG. 2, to the left direction) relative to the molded member 5 is regulated by the constituent flange section 511 of the sheath holding portion 51.

The bracket 7 is made of a plate shape metal such as an aluminum or the like, for example. The bracket 7 is configured to integrally include the wrapping and tightening portion 71, which is wrapped and tightened around the outer peripheral surface 5a of the molded member 5, and a fixing portion 72, which is fixed to a vehicle body side fixing target. The wrapping and tightening portion 71 acts as a pressing portion to press the molded member 5. The fixing portion 72 is formed with the through hole 720 passing therethrough in its plate thickness direction. The wrapping and tightening portion 71 is wrapped around one half or more of a circumference of the outer peripheral surface 5a of the molded member 5 when viewed in the axial direction. The wrapping and tightening portion 71 is configured to hold the electric wire holding portion 52 together with the sheath holding portion 51. The outer peripheral surface 5a of the molded member 5 being wrapped and tightened by the wrapping and tightening portion 71 being brought into contact therewith is configured to extend from the outer peripheral surface of the sheath holding portion 51 to the outer peripheral surface of the electric wire holding portion 52. The wrapping and tightening portion 71 may be wrapped and tightened around the entire outer peripheral surface 5a of the main body section 510 constituting the sheath holding portion 51.

Since the constituent wrapping and tightening portion 71 of the bracket 7 is wrapped and tightened around the outer peripheral surface 5a of the molded member 5 lying between the flange section 511 and the boundary 5b of the molded member 5, it is possible to suppress the occurrence of water ingress from the gap between the sheath 4 and the molded member 5. Further, since the constituent wrapping and tightening portion 71 of the bracket 7 is configured to press the outer peripheral surface 5a of the molded member 5 extending from the outer peripheral surface of the sheath holding portion 51 to the outer peripheral surface of the electric wire holding portion 52, it is possible to further suppress the occurrence of the water ingress into the sheath 4.

Protective Tube

The wire harness 1 according to the present embodiment is configured to include two elastic protective tubes 9, which are provided to cover tip end portions of the first and the second guiding out portions 53 and 54, respectively, constituting the molded member 5, and the first two and the second two insulated electric wires 2 and 3 being guided out from the first and the second guiding out portions 53 and 54, respectively, and two tightening members 8A and 8B, which are provided to tighten and fix respective one end portions of the two elastic protective tubes 9 to outer peripheral surfaces 53a and 54a of the first and the second guiding out portions 53 and 54, respectively. The two tightening members 8A and 8B also act as pressing members to press the first and the second guiding out portions 53 and 54 with the two protective tubes 9 between the two tightening members 8A and 8B and the first and the second guiding out portions 53 and 54, respectively.

In the present embodiment, the two elastic protective tubes 9 are referred to as the first protective tube 91, which is provided to cover a periphery of a tip end portion of the first guiding out portion 53 and the two first insulated electric wires 2 being guided out from the first guiding out portion 53, and as the second protective tube 92, which is provided to cover a periphery of a tip end portion of the second guiding out portion 54 and the two second insulated electric wires 3 being guided out from the second guiding out portion 54. The provision of the first and the second protective tubes 91 and 92 makes it possible to suppress the occurrence of damage to the first two and the second two insulated electric wires 2 due to a chipped off stone or the like. Note that the first and the second protective tubes 91 and 92 may be provided to cover the entire first guiding out portion 53 and the entire second guiding out portion 54 as well as the tip end portions of the first and the second guiding out portions 53 and 54.

One end portion of the first protective tube 91 is tightened and fixed to an outer peripheral surface 53a of the first guiding out portion 53 by the first tightening member 8A. This allows the first protective tube 91 to adhere tightly to the outer peripheral surface 53a of the first guiding out portion 53, and thereby suppress the occurrence of water ingress into the first protective tube 91 from the gap between the first protective tube 91 and the first guiding out portion 53. Further, the one pair of first insulated electric wires 2 and the first guiding out portion 53 surrounding the one pair of first insulated electric wires 2 are adhered tightly to each other by the tightening of the first tightening member 8A. As a result, even in the event of the water ingress into the first protective tube 91, it is possible to suppress the occurrence of the water ingress into the sheath 4 from the gaps between the one pair of first insulated electric wires 2 and the first guiding out portion 53.

Similarly, one end portion of the second protective tube 92 is tightened and fixed to an outer peripheral surface 54a of the second guiding out portion 54 by the second tightening member 8B. This allows the second protective tube 92 to adhere tightly to the outer peripheral surface 54a of the second guiding out portion 54, and thereby suppress the occurrence of water ingress into the second protective tube 92 from the gap between the second protective tube 92 and the second guiding out portion 54. Further, the one pair of second insulated electric wires 3 and the second guiding out portion 54 surrounding the one pair of second insulated electric wires 3 are adhered tightly to each other by the tightening of the first tightening member 8B. As a result, even in the event of the water ingress into the second protective tube 92, it is possible to suppress the occurrence of the water ingress into the sheath 4 from the gaps between the one pair of second insulated electric wires 3 and the second guiding out portion 54.

As the two protective tubes 9, a material having such an elasticity as to be deformed according to the tightening forces of the tightening members 8A and 8B may be used, and examples of the material for the two protective tubes 9 to be able to be used include: rubber materials such as an EPDM, an urethane rubber, a silicon rubber, a butyl rubber, a fluorine rubber, an acrylic rubber, a butadiene rubber, and the like, or resin materials such as a polyurethane resin, a vinyl chloride resin and the like. The two protective tubes 9 are the members that have both a role of suppressing water from ingress into the sheath 4 and a role of protecting the first two and the second two insulated electric wires 2 and 3 from chipping and the like. For that reason, as the two protective tubes 9 to be used in the wire harness 1 for an automobile, it is desirable to use the ones being sufficiently high in the resistance to a chipped off stone (chipping), the weather resistance, and the chemical resistance. In the present embodiment, the two protective tubes 9 made of the EPDM satisfying those properties are used.

The thicknesses of the two protective tubes 9 may be not less than 0.5 mm and not more than 3.0 mm. This is because if the thicknesses of the two protective tubes 9 are less than 0.5 mm, there is a high possibility that the two protective tubes 9 will be broken by chipping, or if the thicknesses of the two protective tubes 9 exceed 3.0 mm, the two protective tubes 9 become hard and difficult to do routing work on. Further, the thicknesses of the two protective tubes 9 are preferably thinner than the thicknesses of the first and the second guiding out portions 53 and 54 (the distances from the outer peripheral surfaces of the first two and the second two insulated electric wires 2 and 3 to the outer peripheral surfaces of the first and the second guiding out portions 53 and 54). By making the thicknesses of the two protective tubes 9 thinner than the thicknesses of the first and the second guiding out portions 53 and 54, it is easier to apply the tightening forces (pressing forces) of the two tightening members 8A and 8B to the first and the second guiding out portions 53 and 54 with the two protective tubes 9 between the two tightening members 8A and 8B and the first and the second guiding out portions 53 and 54, respectively, so the occurrence of the water ingress into the sheath 4 is further suppressed.

In the present embodiment, a first connector 23 is covering a tip end portion of the one pair of first insulated electric wires 2. The first connector 23 is configured to include a first terminal 231, which is covering the tip end portion of the one pair of first insulated electric wires 2, and a first connector housing 232, which is provided to cover the first terminal 231 and a part of the one pair of first insulated electric wires 2. The first connector housing 232 has a circular cylindrical shape first connector side guiding out portion 233 for guiding out the one pair of first insulated electric wires 2. The first connector side guiding out portion 233 is provided with a first wire seal 234 for sealing between an inner peripheral surface of the first connector side guiding out portion 233 and an outer peripheral surface of the one pair of first insulated electric wires 2.

In the present embodiment, the other end portion of the first protective tube 91 (the end portion opposite to the molded member 5) is tightened and fixed to an outer peripheral surface 233*a* of the first connector side guiding out portion 233 by a first connector side tightening member 8C. This allows the suppression of the occurrence of water ingress into the first protective tube 91 from the other end side of the first protective tube 91.

Similarly, a second connector 33 is covering a tip end portion of the one pair of second insulated electric wires 3. The second connector 33 is configured to include a second terminal 331, which is covering the tip end portion of the one pair of second insulated electric wires 3, and a second connector housing 332, which is provided to cover the second terminal 331 and a part of the one pair of second insulated electric wires 3. The second connector housing 332 has a circular cylindrical shape second connector side guiding out portion 333 for guiding out the one pair of second insulated electric wires 3. The second connector side guiding out portion 333 is provided with a second wire seal 334 for sealing between an inner peripheral surface of the second connector side guiding out portion 333 and an outer peripheral surface of the one pair of second insulated electric wires 3.

The other end portion of the second protective tube 92 (the end portion opposite to the molded member 5) is tightened and fixed to an outer peripheral surface 333*a* of the second connector side guiding out portion 333 by a second connector side tightening member 8D. This allows the suppression of the occurrence of water ingress into the second protective tube 92 from the other end side of the second protective tube 92.

Figure 4A:
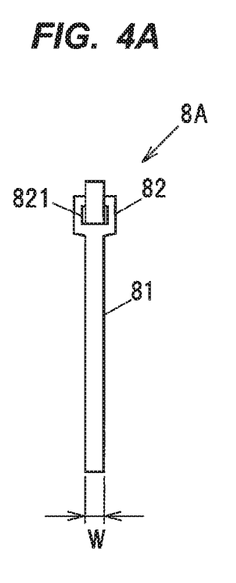
FIG. 4A is a front view showing a configuration example of a first tightening member.
Figure 4B:
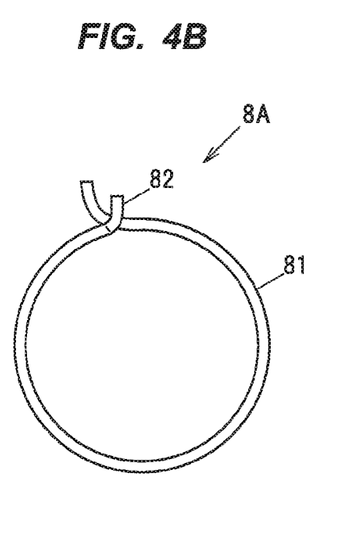
FIG. 4B is a left side view showing the configuration example of the first tightening member.

FIGS. 4A and 4B are a front view and a side view, respectively, showing a configuration example of the first tightening member 8A. Note that, although not shown, the second tightening member 8B, the first connector side tightening member 8C, and the second connector side tightening member 8D can also be configured in the same manner as the first tightening member 8A.

The first tightening member 8A is configured to include a strip shape main body section 81, and a locking head 82 with a notch 821 in one end portion of that main body section 81, and the other end portion of the main body section 81 is inserted in and passed through that locking head 82. The notch 821 is designed to lock the main body section 81, with the first guiding out portion 53 being maintained tight by the main body section 81. The first and the second tightening members 8A and 8B and the first and the second connector side tightening members 8C and 8D are made of, e.g., a synthetic resin or a metal such as an SUS or the like.

The width of the first tightening member 8A (the width of the main body section 81), W, may be not less than 3.0 mm and not more than 10.0 mm. This is because if the width W of the first tightening member 8A is less than 3.0 mm, there is a risk that the penetration of water into the two protective tubes 9 may not be sufficiently suppressed, or if the width W of the first tightening member 8A exceeds 10.0 mm, a high force is required during tightening, which is not preferable from the point of view of work efficiency.

In the present embodiment, the end portions of the two protective tubes 9 are provided with their respective one tightening member 8A, 8B, 8C and 8D, but each of the end portions of the two protective tubes 9 may be provided with a plurality of the tightening members. In this case, the plurality of the tightening members may be provided to be spaced apart from each other in the longitudinal directions of the two protective tubes 9 respectively. By the plurality of the tightening members being used, even when the widths W of the plurality of the tightening members are narrowed (e.g. to less than 3.0 mm), it is possible to suppress the occurrence of the water ingress into the two protective tubes 9.

Actions and Advantageous Effects of the Embodiment

As described above, the wire harness 1 according to the present embodiment is configured to include the two elastic protective tubes 9 being provided to cover the tip end portions of the first and the second guiding out portions 53 and 54, respectively, constituting the molded member 5, and the first two and the second two insulated electric wires 2 and 3 being guided out from the first and the second guiding out portions 53 and 54, respectively, and the two tightening members 8A and 8B being provided to tighten and fix the respective one end portions of the two elastic protective tubes 9 to the outer peripheral surfaces 53*a* and 54*a* of the first and the second guiding out portions 53 and 54, respectively.

The provision of the two protective tubes 9 makes it possible to suppress the occurrence of damage to the first two and the second two insulated electric wires 2 and 3 due to a chipped off stone or the like. Further, by tightening and fixing the two protective tubes 9 to the molded member 5, water is prevented from ingress into the two protective tubes 9 from the gaps between the two protective tubes 9 and the molded member 5, and so it is possible to suppress the occurrence of the ingress of moisture into the sheath 4.

Further, in the wire harness 1, since the first guiding out portion 53 and the second guiding out portion 54 are provided in the molded member 5 according to the guiding out directions of the one pair of first insulated electric wires 2 and the one pair of second insulated electric wires 3, it is possible to allow the first two and the second two insulated electric wires 2 and 3 to branch off at the end portion of the sheath 4 and guide them out in the different directions respectively. Further, in the wire harness 1, the one pair of first insulated electric wires 2 of the same system having the same connection destination are inserted in and passed through the first guiding out portion 53 together, while the one pair of second insulated electric wires 3 of the same system to be connected to another connection destination are inserted in and passed through the second guiding out portion 54 together. For this reason, even when a force is exerted to bend the one pair of first insulated electric wires 2 and the one pair of the second insulated electric wires 3 in the different directions respectively, the first guiding out portion 53 and the second guiding out portion 54 can be curved independently and individually, therefore water can be prevented from ingress into the sheath 4 from the gaps between the first guiding out portion 53 and the one pair of first insulated electric wires 2 or from the gaps between the second guiding out portion 54 and the one pair of second insulated electric wires 3.

Other Embodiments

Figure 5A:
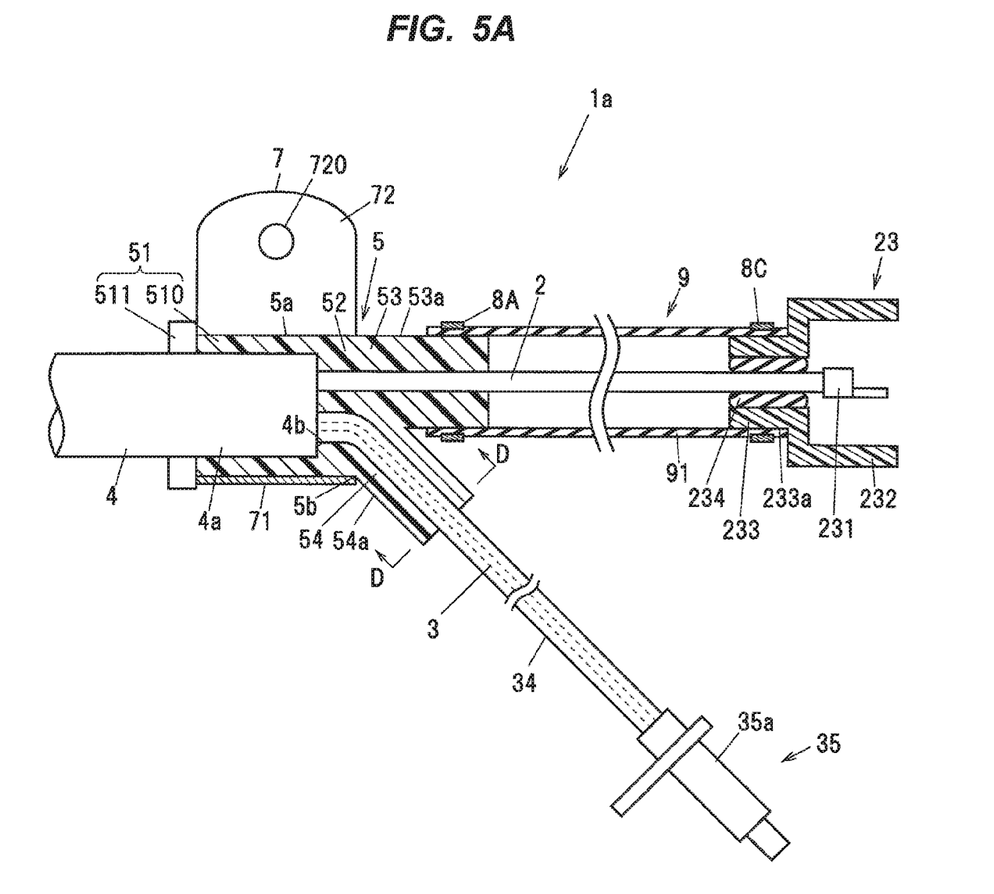
FIG. 5A is a longitudinal cross-sectional view showing a wire harness according to another embodiment of the present invention.

Next, another embodiment of the present invention will be described. FIG. 5A is a longitudinal cross-sectional view showing a wire harness according to another embodiment of the present invention, and FIG. 5B is a cross-sectional view taken along line D-D of FIG. 5A.

Figure 5B:
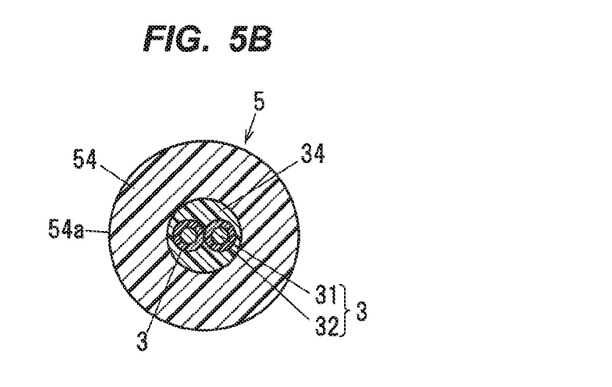
FIG. 5B is a cross-sectional view taken along line D-D in FIG. 5A.

A wire harness 1a as shown in FIGS. 5A and 5B is basically the same in configuration as the wire harness 1 as shown in FIGS. 1 and 2, but the wire harness 1a is different in the material for the molded member 5 from the wire harness 1. In the wire harness 1a, the molded member 5 is configured with a molding resin made of an urethane resin.

The wire harness 1a is provided with an inner sheath 34 for covering the one pair of second insulated electric wires 3 together. The inner sheath 34 is configured with an urethane resin which is made of the same material as the material for the molded member 5. The inner sheath 34 and the molded member 5 are welded together and made integral by the heat during the molding of the molded member 5, thereby suppressing water from ingress from the gap between the inner sheath 34 and the molded member 5.

Further, in the wire harness 1a, a sensor section 35 is provided integrally with and over the tip end portion of the one pair of second insulated electric wires 3. The sensor section 35 is designed to constitute, for example, an ABS sensor, and is equipped with a built-in magnetic sensor (not shown). The sensor section 35 has a housing 35a, which is configured with a molding resin made of an urethane resin. The housing 35a and the inner sheath 34 are welded together and made integral by the heat during the molding of the housing 35a, thereby suppressing water from ingress from the gap between the inner sheath 34 and the housing 35a.

In this manner, in the wire harness 1a, the inner sheath 34 and the molded member 5 are welded together and made integral, while the inner sheath 34 and the sensor section 35 (the housing 35a) are welded together and made integral, and further the occurrence of damage to the one pair of second insulated electric wires 3 due to chipping can be suppressed by the inner sheath 34, therefore making it possible to omit the provision of the second protective tube 92. For that reason, in the wire harness 1a, the peripheries of the tip end portion of the second guiding out portion 54 and the one pair of second insulated electric wires 3 being guided out from the second guiding out portion 54 are not covered by the second protective tube 92. Further, in the wire harness 1a, the second tightening member 8B and the second connector side tightening member 8D are also being omitted with the omission of the second protective tube 92. Thus, the wire harness 1a makes it possible to ensure the reduction of the number of parts, and the reduction of the production cost.

SUMMARY OF THE EMBODIMENTS

Next, the technical ideas grasped from the above-described embodiments will be described with the aid of the reference characters and the like in the embodiments. It should be noted, however, that each of the reference characters and the like in the following descriptions is not to be construed as limiting the constituent elements in the claims to the members and the like specifically shown in the embodiments.

[1] A wire harness (1), comprising: a plurality of insulated electric wires (2, 3), each including a conductor wire (21, 31), and an electrical insulating member (22, 32) covering the conductor wire (21, 31); a sheath (4) covering a part in a longitudinal direction of the plurality of insulated electric wires (2, 3); and a branching portion fixing member (5) covering an end portion (4a) of the sheath (4) with the plurality of insulated electric wires (2, 3) being guided out therefrom, and one-parts in respective longitudinal directions of the plurality of insulated electric wires (2, 3) being guided out from the end portion (4a) of the sheath (4), the branching portion fixing member (5) including a plurality of cylindrical shape guiding out portions (53, 54), which are configured to guide out the one parts of the plurality of insulated electric wires (2, 3) respectively, wherein the wire harness (1) further comprises an elastic protective tube (9), which is provided to cover at least one of the plurality of guiding out portions (53, 54) constituting the branching portion fixing member (5), and the insulated electric wire (2, 3) being guided out from the at least one of the plurality of guiding out portions (53, 54), and a tightening member (8A, 8B), which is provided to tighten and fix one end portion of the protective tube (9) to an outer peripheral surface (53a, 54a) of the at least one of the plurality of guiding out portions (53, 54).

[2] The wire harness (1) as defined by [1] above, further comprising a connector side tightening member (8C, 8D), which is provided to tighten and fix an other end portion of the protective tube (9) to an outer peripheral surface (232a, 332a) of a connector housing (232, 332), which is provided at a tip end portion of the insulated electric wire (2, 3).

[3] The wire harness (1) as defined by [1] or [2] above, wherein the branching portion fixing member (5) includes a first guiding out portion (53), which is configured to guide out some ones (2) of the plurality of insulated electric wires (2, 3), and a second guiding out portion (54), which is configured to guide out some other ones (3) of the plurality of insulated electric wires (2, 3), wherein the protective tube (9) are provided to cover at least one of a periphery of a tip end portion of the first guiding out portion (53) and the some ones (2) of the plurality of insulated electric wires (2, 3) being guided out from the first guiding out portion (53), or a periphery of a tip end portion of the second guiding out portion (54) and the some other ones (3) of the plurality of insulated electric wires (2, 3) being guided out from the second guiding out portion (54).

[4] The wire harness (1) as defined by [3] above, wherein a guiding out direction of the some ones (2) of the plurality of insulated electric wires (2, 3) from the first guiding out portion (53) of the branching portion fixing member (5) and a guiding out direction of the some other ones (3) of the plurality of insulated electric wires (2, 3) from the second guiding out portion (54) of the branching portion fixing member (5) are different from each other.

[5] The wire harness (1) as defined by [4] above, further comprising a fixing member (7) for attaching the branching portion fixing member (5) to an attachment target, wherein a movement of the fixing member (7) to one side relative to the branching portion fixing member (5) is regulated by the second guiding out portion (54) of the branching portion fixing member (5).

[6] The wire harness (1) as defined by any one of [3] to [5] above, wherein the branching portion fixing member (5) comprises a molded body comprising a rubber-like elastic body, wherein the protective tube (9) are provided to cover both of the periphery of the tip end portion of the first guiding out portion (53) and the some ones (2) of the plurality of insulated electric wires (2, 3) being guided out from the first guiding out portion (53), and the periphery of the tip end portion of the second guiding out portion (54) and the some other ones (3) of the plurality of insulated electric wires (2, 3) being guided out from the second guiding out portion (54), respectively.

[7] The wire harness (1) as defined by [6] above, wherein the branching portion fixing member (5) comprises an EPDM (ethylene propylene diene rubber).

[8] The wire harness (1a) as defined by any one of [3] to [5] above, wherein the branching portion fixing member (5) comprises a molding resin comprising an urethane resin, wherein the some other ones (3) of the plurality of insulated electric wires (2, 3), which are guided out from the second guiding out portion (54), are covered together with an inner sheath (4) comprising an urethane resin, wherein the periphery of the tip end portion of the second guiding out portion (54) and the some other ones (3) of the plurality of insulated electric wires (2, 3), which are guided out from the second guiding out portion (54), are not covered with the protective tube (9).

[9] The wire harness (1a) as defined by any one of [1] to [8] above, further comprising a fixing member (7) for attaching the branching portion fixing member (5) to an attachment target, wherein at least a part of an outer peripheral surface of the branching portion fixing member (5), which is in correspondence with an outer peripheral side of the sheath (4), is tightened by the fixing member (7).

[10] The wire harness (1) as defined by [9] above, wherein the fixing member (7) is tightening at least a part of the outer peripheral surface of the branching portion fixing member (5), which is in correspondence with an outer peripheral side of the plurality of insulated electric wires (2, 3) being guided out from the end portion (4a) of the sheath (4).

Although the embodiments of the present invention have been described above, the embodiments described above are not to be construed as limiting the inventions according to the claims. In addition, it should be noted that not all the combinations of the features described in the embodiments are essential to the means for solving the problems of the invention.

The present invention can be appropriately modified and implemented without departing from the spirit thereof. For example, although, in the above-described embodiments, the case where the first two and the second two insulated electric wires 2 and 3 are guided out in different directions from one another has been described, the first two and the second two insulated electric wires 2 and 3 may be guided out in the same direction. Further, the one pair of first insulated electric wires 2 may be guided out from separate guiding out portions respectively, and their respective guiding out portions may be covered with the separate protective tubes 9 respectively, while the one pair of second insulated electric wires 3 may be guided out from separate guiding out portions respectively, and their respective guiding out portions may be covered with the separate protective tubes 9 respectively. Furthermore, for example, when a damper electric wire is added as a third insulated electric wire, the two protective tubes 9 may be provided to cover a periphery of a tip end portion of a third guiding out portion of the third insulated electric wire and the third insulated electric wire, and the two protective tubes 9 may be tightened and fixed to the outer periphery of the third guiding out portion of the third insulated electric wire with a third tightening member. There is no particular limitation on the applications of the wire harness 1 as well.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A wire harness, comprising:
a plurality of insulated electric wires, each including a conductor wire, and an electrical insulating member covering the conductor wire;
a sheath covering a part in a longitudinal direction of the plurality of insulated electric wires;
a branching portion fixing member covering an end portion of the sheath with the plurality of insulated electric wires being guided out therefrom, and first parts of the plurality of insulated electric wires in respective longitudinal directions of the plurality of insulated electric wires being guided out from the end portion of the sheath, the branching portion fixing member including a plurality of cylindrical shape guiding out portions, which are configured to guide out the first parts of the plurality of insulated electric wires respectively;
an elastic insulative protective tube including one of an ethylene propylene diene rubber, an urethane rubber, a silicon rubber, a butyl rubber, a fluorine rubber, an acrylic rubber, a butadiene rubber, a polyurethane resin, and a vinyl chloride resin, the elastic protective tube being provided to cover at least one of the plurality of guiding out portions constituting the branching portion fixing member, and the insulated electric wires being guided out from the at least one of the plurality of guiding out portions; and a tightening member, which is provided to tighten and fix one end portion of the protective tube to an outer peripheral surface of the at least one of the plurality of guiding out portions, wherein the protective tube comprises a part that covers the at least one of the plurality of the guiding out portions, wherein the tightening member tightens only the part that covers the at least one of the plurality of the guiding out portions and the at least one of the plurality of the guiding out portions, and wherein a thickness of the protective tube in the part that covers the at least one of the plurality of the guiding out portions is less than a thickness of the at least one of the plurality of the guiding out portions which is a distance from an outer peripheral surface of the insulated electric wires to the outer peripheral surface of the at least one of the plurality of the guiding out portions.

2. The wire harness according to claim 1, further comprising:

a connector side tightening member, which is provided to tighten and fix an other end portion of the protective tribe to an outer peripheral surface of a connector housing, which is provided at a tip end portion of the insulated electric wires.

3. The wire harness according to claim 1, wherein the branching portion fixing member includes a first guiding out portion, which is configured to guide out some ones of the plurality of insulated electric wires, and a second guiding out portion, which is configured to guide out some other ones of the plurality of insulated electric wires, and wherein the protective tube is provided to cover one of:
a periphery of a tip end portion of the first guiding out portion and the some ones of the plurality of insulated electric wires being guided out from the first guiding out portion; and
a periphery of a tip end portion of the second guiding out portion and the some other ones of the plurality of insulated electric wires being guided out from the second guiding out portion.

4. The wire harness according to claim 3, wherein a guiding out direction of the some ones of the plurality of insulated electric wires from the first guiding out portion of the branching portion fixing member and a guiding out direction of the some other ones of the plurality of insulated electric wires from the second guiding out portion of the branching portion fixing member are different from each other.

5. The wire harness according to claim 4, further comprising:

a fixing member for attaching the branching portion fixing member to an attachment target, wherein a movement of the fixing member to one side relative to the branching portion fixing member is regulated by the second guiding out portion of the branching portion fixing member.

6. The wire harness according to claim 3, wherein the branching portion fixing member comprises a molding resin comprising an urethane resin, wherein the protective tube is provided to cover the periphery of the tip end portion of the first guiding out portion and the some ones of the plurality of insulated electric wires being guided out from the first guiding out portion, wherein the some other ones of the plurality of insulated electric wires, which are guided out from the second guiding out portion, are covered together with an inner sheath comprising an urethane resin, wherein the some ones of the plurality of insulated electric wires, which are guided out from the first guiding out portion, are not covered with the inner sheath, wherein the periphery of the tip end portion of the second guiding out portion and the some other ones of the plurality of insulated electric wires, which are guided out from the second guiding out portion, are not covered with the protective tube, and wherein the periphery of the tip end portion of the first guiding out portion and the some other ones of the plurality of insulated electric wires, which are guided out from the first guiding out portion, are covered with the protective tube.

7. The wire harness according to claim 6, wherein the inner sheath and the branching portion fixing member are welded together and made integral.

8. The wire harness according to claim 1, further comprising:

a fixing member for attaching the branching portion fixing member to an attachment target, wherein at least a part of an outer peripheral surface of the branching portion fixing member, which is in correspondence with an outer peripheral side of the sheath, is tightened by the fixing member.

9. The wire harness according to claim 8, wherein the fixing member is tightening at least a part of the outer peripheral surface of the branching portion fixing member, which is in correspondence with an outer peripheral side of the plurality of insulated electric wires being guided out from the end portion of the sheath.

10. The wire harness according to claim 1, wherein the elastic insulative protective tube includes the ethylene propylene diene rubber.

11. The wire harness according to claim 3, wherein the protective tube is provided to cover the periphery of the tip end portion of the first guiding out portion and the some ones of the plurality of insulated electric wires being guided out from the first guiding out portion.

12. The wire harness according to claim 11, wherein the some ones of the plurality of insulated electric wires, which are guided out from the first guiding out portion, are not covered with the inner sheath.

13. The wire harness according to claim 3, wherein the periphery of the tip end portion of the first guiding out portion and the some other ones of the plurality of insulated electric wires are covered with the protective tube.

14. The wire harness according to claim 1, further comprising:

a connector covering a tip end portion of the first parts of the plurality of insulated electric wires, wherein the connector includes:
a terminal that covers the tip end portion of the first parts of the plurality of insulated electric wires; and
a connector housing that covers the terminal and the first parts of the plurality of insulated electric wires.

15. The wire harness according to claim 14, wherein the connector housing includes a connector side guiding out portion for guiding out the first parts of the plurality of insulated electric wires from the protective tube, and wherein, in a radial direction of the protective tube, the connector side guiding out portion is disposed between the protective tube and the first parts of the plurality of insulated electric wires.

16. The wire harness according to claim 15, further comprising:
a seal member for sealing between an inner peripheral surface of the connector side guiding out portion and an outer peripheral surface of the first parts of the plurality of insulated electric wires.

17. The wire harness according to claim 15, wherein a distal end of the connector side guiding out portion extends outside of the protective tube.

18. The wire harness according to claim 17, wherein an outer diameter of the distal end of the connector side guiding out portion is more than an outer diameter of a portion of the connector side guiding out portion that is covered by the protective tube.

19. A wire harness, comprising:
a plurality of insulated electric wires, each including a conductor wire, and an electrical insulating member covering the conductor wire;
a sheath covering a part in a longitudinal direction of the plurality of insulated electric wires;
a branching portion fixing member covering an end portion of the sheath with the plurality of insulated electric wires being guided out therefrom, and first parts of the plurality of insulated electric wires in respective longitudinal directions of the plurality of insulated electric wires being guided out from the end portion of the sheath, the branching portion fixing member including a plurality of cylindrical shape guiding out portions, which are configured to guide out the first parts of the plurality of insulated electric wires respectively;
an elastic insulative protective tube including one of an ethylene propylene diene rubber, an urethane rubber, a silicon rubber, a butyl rubber, a fluorine rubber, an acrylic rubber, a butadiene rubber, a polyurethane resin, and a vinyl chloride resin, the elastic protective tube being provided to cover at least one of the plurality of guiding out portions constituting the branching portion fixing member, and the insulated electric wires being guided out from the at least one of the plurality of guiding out portions; and
a tightening member, which is provided to tighten and fix one end portion of the protective tube to an outer peripheral surface of the at least one of die plurality of guiding out portions
wherein the branching portion fixing member includes a first guiding out portion, which is configured to guide out some ones of the plurality of insulated electric wires, and a second guiding out portion, which is configured to guide out some other ones of the plurality of insulated electric wires,
wherein the branching portion fixing member comprises a molded body comprising a rubber-like elastic body,
wherein the protective tube is provided to cover a periphery of a tip end portion of the first guiding out portion and the some ones of the plurality of insulated electric wires being guided out from the first guiding out portion,
wherein another insulative protective tube is provided to cover a periphery of a tip end portion of the second guiding out portion and the some other ones of the plurality of insulated electric wires being guided out from the second guiding out portion,
wherein the protective tube comprises a part that covers the at least one of the plurality of the guiding out portions,
wherein the tightening member tightens only the part that covers the at least one of the plurality of the guiding out portions and the at least one of the plurality of the guiding out portions, and
wherein a thickness of the protective tube in the part that covers the at least one of the plurality of the out portions is less than a thickness of the at least one of the plurality of the guiding out portions which is a distance from an outer peripheral surface of the insulated electric wires to the outer peripheral surface of the at least one of the plurality of the guiding out portions.

20. The wire harness according to claim 19, wherein the branching portion fixing member comprises an EPDM (ethylene propylene diene rubber).

* * * * *